Fig. 1 SCORING GEOMETRY

Fig. 2

Fig. 4A  105 MM DOPPLER FOR 10 FT MISS

Fig. 4B

SAMPLE

REDUCED MISS DISTANCE = 11.5 FT

INVENTORS
ROBERT M. STINE
HOMER F. ROLAND
BY Harry A. Herbert Jr
George Fine
ATTORNEYS

United States Patent Office 3,350,712
Patented Oct. 31, 1967

3,350,712
DOPPLER METHOD AND SYSTEM FOR MEASURING MISS DISTANCE
Robert M. Stine, Holloman AFB, N. Mex., and Homer F. Roland, Fort Walton Beach, Fla., assignors to the United States of America as represented by the Secretary of the Air Force
Filed Oct. 4, 1966, Ser. No. 584,284
2 Claims. (Cl. 343—12)

ABSTRACT OF THE DISCLOSURE

A method and system for rapidly extracting miss distance information from the Doppler effect created by missiles passing an airborne target equipped with a continuous wave radar detection device. The system extracts two bits of data based upon a preselected frequency. Preselection of a definite frequency causes a readout of cycles and time from the first detection of the preselected frequency as the missile approaches point of closest approach to the second detection of the preselected frequency as the missile departs point of closest approach. The aforementioned cycles and time are separately summed and when used in conjunction with the preselected frequency are applied to an equation or computer to render miss distance.

---

The invention described herein may be manufactured and used by or for the United States Government for governmental purposes without payment to me of any royalty thereon.

This invention relates to a Doppler method and system for measuring miss distance information, and more particularly, to a method and system for rapidly extracting miss distance information from the Doppler effect created by missiles passing an airborne target equipped with a continuous wave (CW) radar detection device.

Modern weapons and weapon systems are complex and expensive. They require effectiveness evaluation before standardization.

The more complex and costly the weapon or system the more difficult and expensive it becomes to evaluate. Effectiveness evaluation of a modern weapon system requires considerable organized effort and expensive installation and material. As the system increases in cost and complexity, it becomes more desirable that no modification be made for evaluation, if possible. Evaluation of some present day air-to-air systems requires modification to the missiles.

For high expenditure of air-to-air missiles for evaluation and personnel training, a simple method of meeting the requirement is by use of continuous wave (CW) radar installed in a target. Scoring information is derived from the Doppler effect.

A target-borne CW radar is simple, small, and relatively inexpensive; it requires no missile augmentation. Range is limited only by system sensitivity and radar cross section of the missile scored. Spectrum utilization is minimum. There are no range ambiguities. The Doppler effect that results from missile detection contains all information necessary to ascertain the minimum separation distance between target and missile during missile approach and departure.

Effective use of CW radar for missile scoring has been retarded severly by the difficulty of extracting scoring parameters quickly and accurately from the Doppler effect. This is presently accomplished electromechanically optically manually with results that are often controversial. Results are variable and dependent to a great extent on individual skill.

Scoring air-to-air missiles by target-borne CW radar is a problem of accurately extracting scoring parameters from the Doppler effect instead of missile detection. If sufficient accuracy exists in the detection of the equal Doppler frequencies during missile-to-target approach and departure, with time, and cycle information summed between these points of detection, spatial separation or miss distance between missile and target can be calculated.

Reliable determination of miss distance between target and missile is contingent upon accurate extraction of the needed parameters from the Doppler effect and two assumptions regarding missile velocity and trajectory. These assumptions are that during scoring time, relative missile velocity and missile trajectory remain linear. For the scoring times of 20 to 200 μsec. involved, these assumptions are valid.

In accordance with the present invention, there is provided a solid state electronic system for the extraction of point of closest approach (miss distance) information from a Doppler signal resultant from vehicle passage through a radiated field from a CW radar.

The system extracts two bits of data based upon a preselected frequency. Preselection of a definite frequency (Fd) causes a readout of (N) cycles and (t) time from first detection of Fd as the vehicle approaches point of closest approach to second detection of Fd as missile departs point of closest approach. N and t are separately summed and when used in conjunction with Fd can be applied to an equation or computer to render miss distance. The equation is as follows:

$$\text{Miss distance} = \frac{NC}{4F_o}\left[\frac{N-Fdt}{4Fd-2N}\right]$$

In summary, the miss distance is given in terms of the number of Doppler cycles generated as the missile travels between two points (N), the Doppler frequency at aforesaid two points (Fd), the time required for the missile to travel between two aforesaid points (t) and the transmitted frequency (Fo). As the frequency of the radar transmitter can be regulated, the "miss distance" can be easily computed upon determining the remaining three parameters.

In order to measure the three parameters, it is necessary to locate a starting and stopping point to the degree of accuracy required. This is accomplished by starting counters which count time and Doppler cycles when a given Doppler frequency (Fd) occurs as the missile approaches the target, then stopping the counters when the same frequency occurs as the missile leaves the target. The three parameters (Fd as selected, N from a cycle counter, and t from a time counter) can then be inserted into the miss distance equation and easily computed. The only requirement being that the selected Doppler frequency (Fd) must be appreciably less than the maximum Doppler frequency that would result from the relative velocity between missile and target from the given situation.

The accuracy to which the miss distance can be measured through this method is generally within 10% of the actual distance when the parameter errors are no greater than listed below:

Error in t: .5 millisecond;
Error in N: 1 cycle;
Error in Fd: 100 cycle per second.

The miss distance accuracy is affected by error in t, N, and Fd in that order. Larger errors in any given parameter can be offset by smaller errors in other parameters to remain within the allowable 10%.

Included in the system of the present invention is a frequency referenced Doppler cycle/time selector which is a solid state apparatus designed to rapidly render sufficient information from a detected CW Doppler train to ascertain rapidly by mathematics or computer aids miss distance (point of closest approach), two points on the trajectory, and relative missile velocity (between the two points) resulting from missile passage past a CW type detection device. Since the device functions against a detected CW Doppler train, munitions acquisition range is unknown and a finite Doppler frequency is selected to initiate a count of N (cycles) and $t$ (time). Assuming a constant munitions velocity in the close proximity of the detecting device, the selected frequency, $Fd$, occurs equidistant and equitime from the point of closest approach during approach and retreat. The N and $t$ counts occurring during missile passage between the two points where the selected $Fd$ occurs are summed on separate counters and are inserted into the miss distance equation to render miss distance information.

An object of the present invention is to provide a Doppler method and system for measuring the miss distance between a missile and its target.

Another object of the present invention is to provide a method and system for rapidly extracting distance information from the Doppler effect created by missiles passing an airborne target equipped with a continuous wave radar detection device.

Various other objects, advantages, and features of novelty which characterize the invention are pointed out with particularity in the claims annexed hereto and forming part hereof. However, for a better understanding of the invention, its advantages, and objects attained by its use, reference should be had to the subjoining drawings, which form a further part hereof, and to the accompanying descriptive matter, in which there is illustrated and described a preferred embodiment of the invention.

In the drawings:

FIGURES 6A–6K show the circuit diagram for FIGURE 5.

Figure 1:
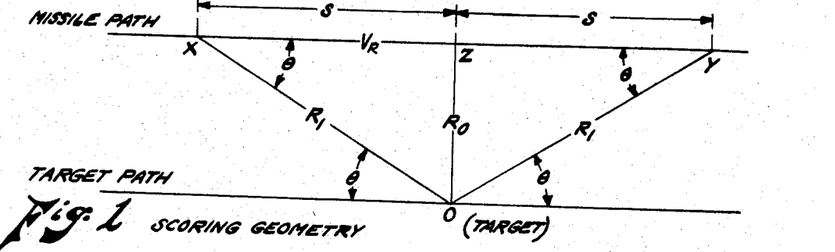
FIGURE 1 shows the scoring geometry utilized in a mathematical analysis of the method of the present invention for obtaining scoring information from the Doppler effect.

The method of the present invention for obtaining scoring information from the Doppler effect is first presented by a mathematical analysis. The miss distance at point of closest approach between a missile and target can be obtained from Doppler, if, during missile to target approach and departure, equal Doppler frequencies can be detected with time and Doppler cycles measured between the detection points. It must be assumed that between the Doppler detection points, differential velocity and trajectory remain constant. For the small times (20 to 200 $\mu$sec.) involved, this is a valid assumption. Any scoring situation can be depicted as shown in FIGURE 1 with the target fixed at point O and the missile passing by a fixed relative velocity $V_R$.

A CW signal transmitted from the target at O is reflected from the missile. If the signal frequency is $F_o$, the time between each wavefront or cycle ($T_o$) is $1/F_o$. In this time the missile will travel a distance of $T_oV_R$ or $V_R/F_o$. Since the signal waves travel in a radial direction from the target, the wavelength of the signal as seen by the missile will be altered by an amount equal to $$V_R \cos \theta / F_o$$

where $\theta$ is the angle between the direction of missile travel and the line between the missile and the target at any given time. The wavefront reflected by the missile travels the same distance on its return to the target. Therefore, the reflected signal as seen at the target will have a wavelength that varies by an amount equal to $2V_R \cos \theta / F_o$ from the wavelength of the transmitted signal. The sign of this quantity will depend upon whether the missile is approaching or receding from the target.

The wavelength of the transmitted frequency ($\lambda_o$) equals $C/F_o$ where C is the velocity of light. The wavelengths of the reflected signal is $$\left(\lambda_o = \frac{C}{F_o} \pm \frac{2V_R \cos \theta}{F_o} = \frac{C \pm 2V_R \cos \theta}{F_o}\right)$$

Therefore, the frequency of the reflected signal is $$F_R = \frac{C}{\lambda_o} = \frac{CF_o}{C \pm 2V_R \cos \theta}$$

If the reflected signal is mixed with the transmitted signal, the difference frequency, $F_d$, will be the absolute value of $$F_o - F_r \text{ or } F_o - F_R = F_d = F_o$$

$$- \frac{CF_o}{C \pm 2V_R \cos \theta} = F_o \left(\frac{2V_R \cos \theta}{C}\right)$$

since $C \gg 2V_R \cos \theta$.

Since the maximum velocity of the missile is very small with relation to the speed of light, the second term in the denominator can be neglected, and the beat frequency becomes:

$$2F_oV_R \cos \theta / C$$

The beat frequency is known as the Doppler frequency, or:

$$F_d = F_oV_R \cos \theta / C$$

Refer to FIGURE 1. As the missile passes the target along its path as shown, the number of Doppler cycles, N, generated as it covers the distance 2S equals the Doppler frequency multiplied by the time required to cover the distance. Since the frequency varies along the path, the number of cycles for a small increment of time, $dt$, is given by: $dN = F_d dt$.

If we measure the time, starting as the missile passes point X, the number of cycles, N, can be obtained by summing up all the increments over that period, or:

$$N = \int_0^{\text{time at Y}} F_d dt$$

Since $V_R$ remains constant, $F_d$ varies in the same manner from X to Z as from Z to Y, and the time required to travel this distance equals $S/V_R$. Therefore:

$$N = 2 \int_0^{S/V_R} F_d dt = 2 \int_0^{S/T_R} \frac{2F_oV_R \cos \theta dt}{C}$$

From the geometry of FIGURE 1:

$$\cos \theta = \frac{S}{R_1} = \frac{S}{\sqrt{R_o^2 + S^2}}$$

But $S = V_R t$

And differentiating with respect to $t$ gives:

$$\frac{ds}{dt} = V_R \text{ or } dt = \frac{ds}{V_R}$$

Substituting these values in the equation for N:

$$N = 2 \int_0^s \frac{2F_oV_R SdS}{C\sqrt{R_o^2 + S^2}V_R}$$

$$N = \frac{4F_o}{C} \int_0^s \frac{SdS}{\sqrt{R_o^2 + S^2}}$$

Integrating gives $$N = \frac{4F_o}{C} [\sqrt{R_o^2 + S^2}]_0^s$$

Inserting the limits:

$$N = \frac{4F_o}{C} [\sqrt{R_o^2 + S^2} - \sqrt{R_o^2 + O^2}] = \frac{4F_o}{C} [\sqrt{R_o^2 + S^2} - R_o]$$

And from the geometry of FIGURE 1

$$S^2 = R_1^2 - R_o^2$$

Therefore:

$$N = \frac{4F_o}{C}[\sqrt{R_1^2} - R_o] = \frac{4F_o}{C}[R_1 - R_o]$$

We now solve for the minimum separation distance, $R_o$, between the missile and target using equations derived in the preceding explanation. $R_o$ is known as the miss distance.

Since $$S^2 = R_1^2 - R_o^2 \text{ and } S = V_R t (V_R t)^2 = R_1^2 - R_o^2$$

Also $$F_d = 2F_o V_R \cos \theta / C$$

But $$\cos \theta = \frac{S}{R_1} = \frac{V_R t}{R_1}$$

Therefore $$F_d = \frac{2F_o V_R (V_R t)}{CR_1} = \frac{2F_o t (V_R)^2}{CR_1} \text{ or } (V_R)^2 t = \frac{F_d C R_1}{2F_o}$$

Since $$(V_R)^2 t(t) = R_1^2 - R_o^2 \left(\frac{F_d C R_1}{2F_o}\right) t = [R_1^2 - R_o^2]$$

But $$N = \frac{4F_o}{C}[R_1 - R_o]$$

Solving for $R_1$ gives:

$$R_1 = R_o + \frac{NC}{4F_o}$$

Since $$\frac{F_d C R_1 t}{2F_o} = R_1^2 - R_o^2 \frac{F_d C T}{2F_o}\left[R_o + \frac{NC}{4F_o}\right] = \left[R_o + \frac{NC}{4F_o}\right]^2 - R_o^2$$

or $$\frac{F_d C T R_o}{2F_o} + \frac{NF_d C^2 t}{8F_o^2} = R_o^2 + \frac{2R_o NC}{4F_o} + \frac{N^2 C^2}{16F_o^2} - R_o^2$$

or $$R_o\left[\frac{F_d C T}{2F_o} - \frac{NC}{2F_o}\right] = \frac{N^2 C^2}{16F_o^2} - \frac{NF_d C^2 t}{8F_o^2}$$

Multiplying through by $2F_o/C$ $$R_o = \frac{NC[N - 2F_d t]}{8F_o[F_d t - N]}$$

Therefore if time is redefined as the time for the missile to travel 2S, which will give a count of 2N instead of N, we get $$R_o = \frac{NC}{4F_o}\left[\frac{N - F_d t}{F_d t - 2N}\right]$$

Figures 2, 4A:
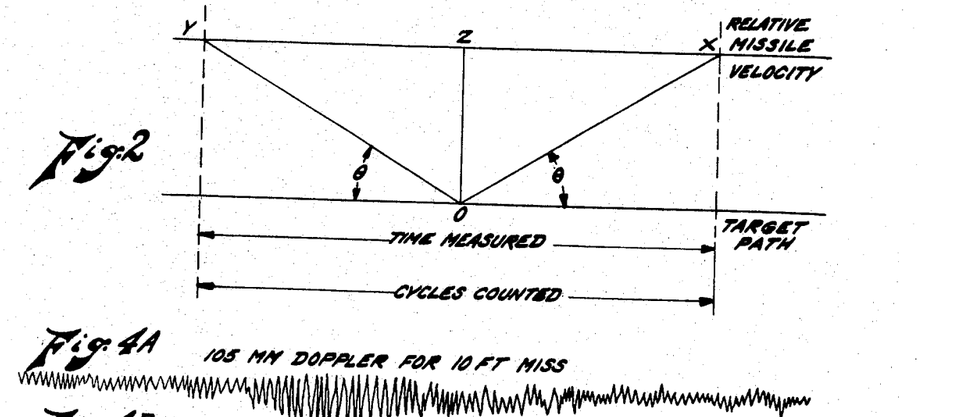
FIGURE 2 shows the scoring geometry of the system of the present invention utilized in obtaining miss distance.
FIGURES 4A, 4B, 4C and 4D are printouts from an actual missile detection.

FIGURE 2 is the scoring geometry for the system of the present invention. The perpendicular line, OZ, between missile and target path is the miss distance. Points X and Y are known equal Doppler frequency points detected during missile-to-target approach and departure. X and Y serve as the starting and ending times for the measurement of time and the counting of cycles.

With the X and Y frequency points identified and the sum of Doppler cycles and the time, miss distance, OZ, can be calculated from:

$$MD = \frac{NC}{4F_o}\left[\frac{N - F_d t}{F_d t - 2N}\right]$$

where $C/F_o$ = Wavelength of radar transmitters frequency
$N$ = The total of Doppler cycles between X and Y
$t$ = A suitable time measurement between X and Y
$F_d$ = The Doppler frequency detected at X and Y.

The major practical considerations were methods for detecting finite equal Doppler frequencies during missile-to-target approach and departure and improving the quality of the Doppler raw data.

Where any miss distance is involved, the Doppler frequency at any instant is equal to:

$$2V/\lambda \cos \theta \text{ (FIGURE 2)}$$

Where:

$V$ = missile velocity
$\lambda = C/F_o$ or transmitter wavelength
$\theta$ = The angle between the direction of missile velocity and the line between the missile and the target.

Since the Doppler effect is continuously changing frequency, detection is a problem of sensing frequency transition through a finite frequency rather than detection of a cycle or a number of cycles at this frequency.

Examination of prerecorded Doppler effect from missiles fired past a CW radar scorer disclosed the need for extensive improvement in raw Doppler quality. Where raw Doppler exists, improvement can be accomplished electronically by reshaping to render a constant amplitude Doppler with the frequencies retained in the time dimension. However, reshaping cannot compensate for loss or drop-out of raw Doppler at and near acquisition. These loss conditions result from antenna pattern configuration nulls, and target obscuration. Since these drop-outs do occur, it becomes necessary to use only that portion of Doppler frequency raw data on either side of minimum frequency where the Doppler frequency raw data is complete.

Figure 3:
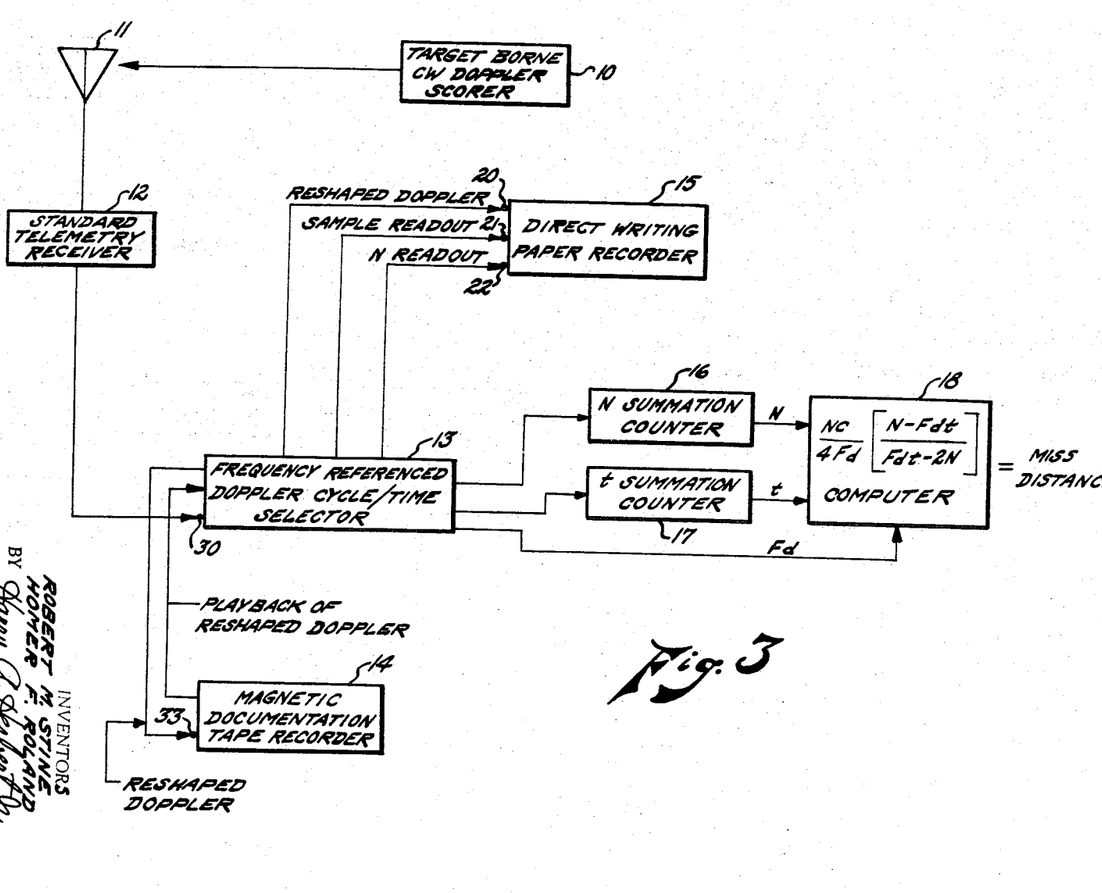
FIGURE 3 shows a block diagram of a preferred embodiment of the system of the present invention.
Figure 4B:
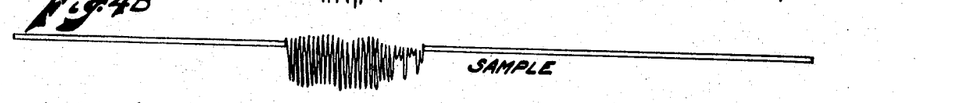
Figure 4C:
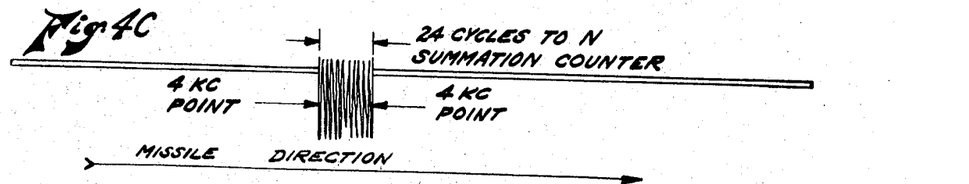
Figure 4D:
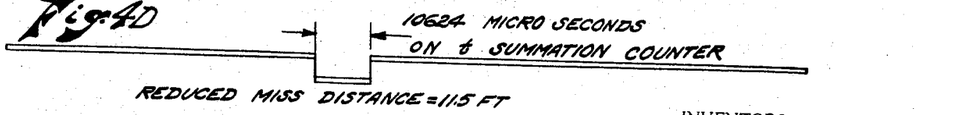

Now referring to FIGURE 3, there is shown airborne target 10 equipped with a continuous wave (CW) radar. When a missile directed at the target passes through a radiated field provided by aforesaid radar return signals are received by a CW Doppler detector included with said CW radar. The detected Doppler signals are transmitted from airborne target 10 by utilizing a conventional data link system with the transmitter thereof also located in airborne target 10. The transmitted detected Doppler signals are received by ground based antenna 11 and fed to telemetry receiver 12. The detected Doppler signal appears at the output of telemetry receiver 12 which is routed through frequency referenced Doppler cycle/time selector 13 by way of terminal 30 for shaping, and then to magnetic documentation tape recorder 14 by way of terminal 33 for documentation and playback and simultaneously to direct writing recorder 15 by way of terminal 20 for examination for quality and selection of proper acquisition delay. An operator examines a print of the Doppler signal on direct writing paper recorder 15 and arbitrarily selects an acquisition delay and Doppler frequency, Fd, which is set into cycle/time selector 13. Pre-recorded reshaped data is played back by tape recorder 14 to cycle/time selector 13 which, after end of acquisition delay, automatically senses the Doppler frequency change through the programmed Fd frequency. Sensing of this transition through the programmed Fd frequency starts the readout of Doppler cycles, N, and time, t. The second sensing of the programmed Fd halts further cycle and time readout. Simultaneous readouts from cycle/time selector 13 of the Doppler cycles, N, and time t, are summed on separate counters 16 and 17, respectively, while reshaped Doppler, sample Doppler and N count which are fed to recorder 15 by way of terminals 20, 21, and 22, respectively, are printed out on paper recorder 15. Examination of paper printout will disclose if N and t are acceptable for mathematical extraction of miss distance in component 18 which may be a computer arranged to calculate the miss distance in accordance with the formula indicated in computer component 18.

FIGURE 4 is a printout from an actual missile detection. The top trace 4A is the raw Doppler. Second trace 4B is the sampled Doppler. In this printout a 10 μs. delay was established to assure that once sampling had started, no signal dropout would occur to cause an erroneous readout. The processing of the Doppler signal was delayed 10 μs. measured from the appearance of the first cycle. The third trace 4C is the N count printout. It is well defined, free of missing cycles, and symmetrical about the crossover or point or closest approach. The last trace 4D shows T or summation. Paramount importance is attached to the time difference between the start of the sample printout and the N count printout. Since the N count printout follows the sample start, this indicates that sampling started at a higher frequency than 4 kc. (Fd detection points). The Fd of 4 kc. and the respective summations of N and t are valid for extraction of miss distance.

Figure 5:
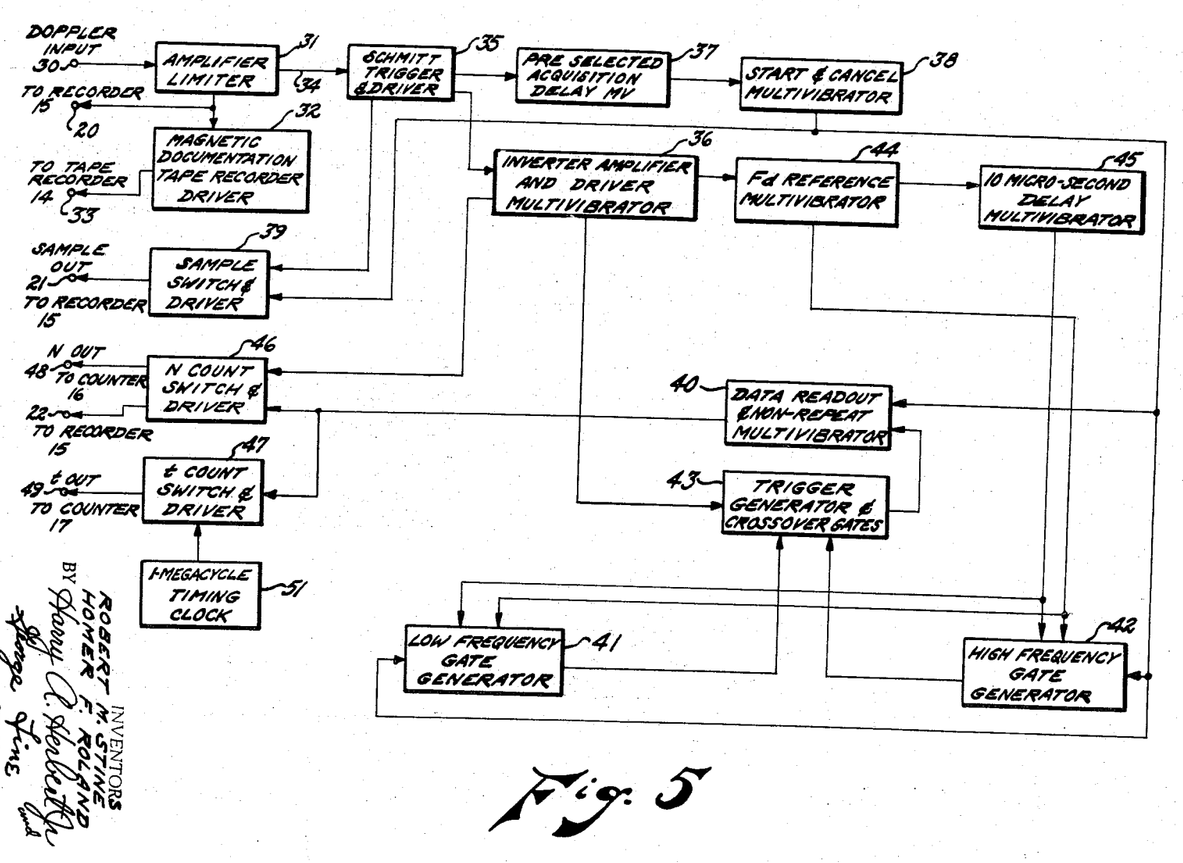
FIGURE 5 is a block diagram of the frequency referenced Doppler-time selector component of FIGURE 3.

Now referring to the frequency referenced Doppler cycle/time selector shown in FIGURE 5 in block diagram form, the detected Doppler signal from the output of telemetry receiver shown in FIGURE 3 is received at input terminal 30 and passed through amplifier limiter 31 for shaping to magnetic documentation tape recorder driver 32 and then to output terminal 33. The reshaped output is also fed from amplifier limiter 31 to terminal 20 for application to recorder 15. The Doppler signal from tape playback may then be routed through input terminal 30 to amplifier limiter 31 where more reshaping occurs. The output of amplifier limiter 31 is received by Schmitt trigger and driver 35 by way of line 34. Schmitt trigger and driver 35 converts all cycles of Doppler to the same amplitude, but retains frequency in the time dimensions. Schmitt trigger and driver 35 continuously drives inverter amplifier and driver multivibrator 36 as long as the Doppler signal is present. Preselected acquisition delay multivibrator 37 also receive a signal from Schmitt trigger and driver 35. Acquisition delay multivibrator 37 serves the purpose of assuring continuity of Doppler once sampling starts. When acquisition delay multivibrator 37 "runs down," it trips "start and cancel" multivibrator 38 to the alternate state. This action removes the shorts from sample driver and switch, data readout and non repeat multivibrator 40, low frequency gate generator 41, and high frequency gate generator 42. Processing of the incoming Doppler signal now occurs.

Inverter amplifier and driver multivibrator 36 sends signals with each incoming cycle of Doppler to trigger generator and crossover gates 43, and to 10 microsecond delay multivibrator 45 and low and high frequency gate generators 41 and 42, respectively, by way of Fd reference multivibrator 44. Low and high frequency gate generators 41 and 42, respectively, also receive a third input signal from 10 microsecond delay multivibrator 45. Low and high frequency gate generators 41 and 42, respectively, are switched with each new cycle of incoming Doppler signal. Ten microsecond multivibrator 45 extends the run time of high frequency gate generator 42 to avoid loss of the new cycle trigger during switching. Crossover gates 43 senses the above or below frequency condition of the incoming Doppler signal with respect to the preselected Fd. The preselected Fd is established in the rundown time of Fd reference multivibrator 44 by a switching arrangement included therein permitting the selection of preselected time constants. If the incoming Doppler signal frequency is greater than the preselected frequency (Fd) represented by the normal time, it is shut off prematurely; if lower, it reaches normal rundown. Crossover gates 43 detect this crossover from high to low frequency about the selected Fd. When crossover occurs, data readout and nonrepeat multivibrator 40 changes condition, and removes the shorts from N and t count drivers and switches 46 and 47, respectively. Data is readout from terminals 48, 49, and 22 until the frequency moves from low to high about the Fd point at which time data readout multivibrator 40 applies a short to N and t drivers and switches 46 and 47, respectively, and holds further readout of N and t. One complete cycle of the data readout multivibrator locks itself out from further operations. The apparatus has detected a preselected Fd on either side of the point of closest approach in the Doppler signal readout of all N and t data between.

It is to be noted that provisions, in the form of selectable time delays, are incorporated to avoid confusion from Doppler drop-out at early acquisition. Fd selections of 2 kc., 4 kc., 6 kc., and 8 kc. are incorporated for the basis of selecting N and t information. Time, t, is from 1 mc. timing clock 51 which is a crystal controlled clock oscillator. The frequency response is from 20 cycles per second to 50,000 cycles per second. Calibration for the sensing of finite Doppler frequencies of 2, 4, 6, and 8 kc. can be achieved with no greater error than 0.75 microsecond for the wavelength of the selected frequencies to be sensed.

Since timing clock 51 is at a megacycle rate, it is obvious that a preselected Fd can be detected with no greater error than one microsecond. It should be observed that detection of a preselected Fd is really the sensing of Doppler increasing or decreasing through a preselected frequency.

Figures 6A, 6B:
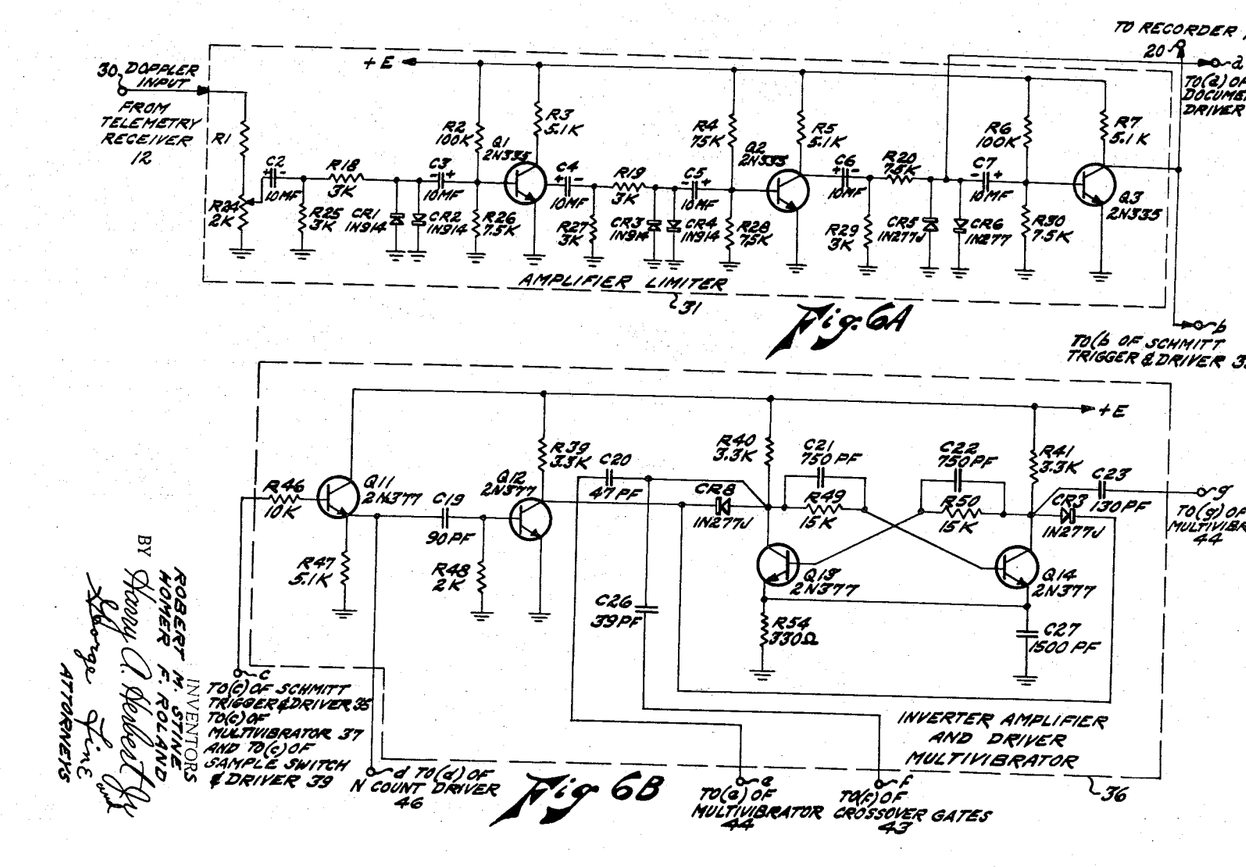
Figure 6A:
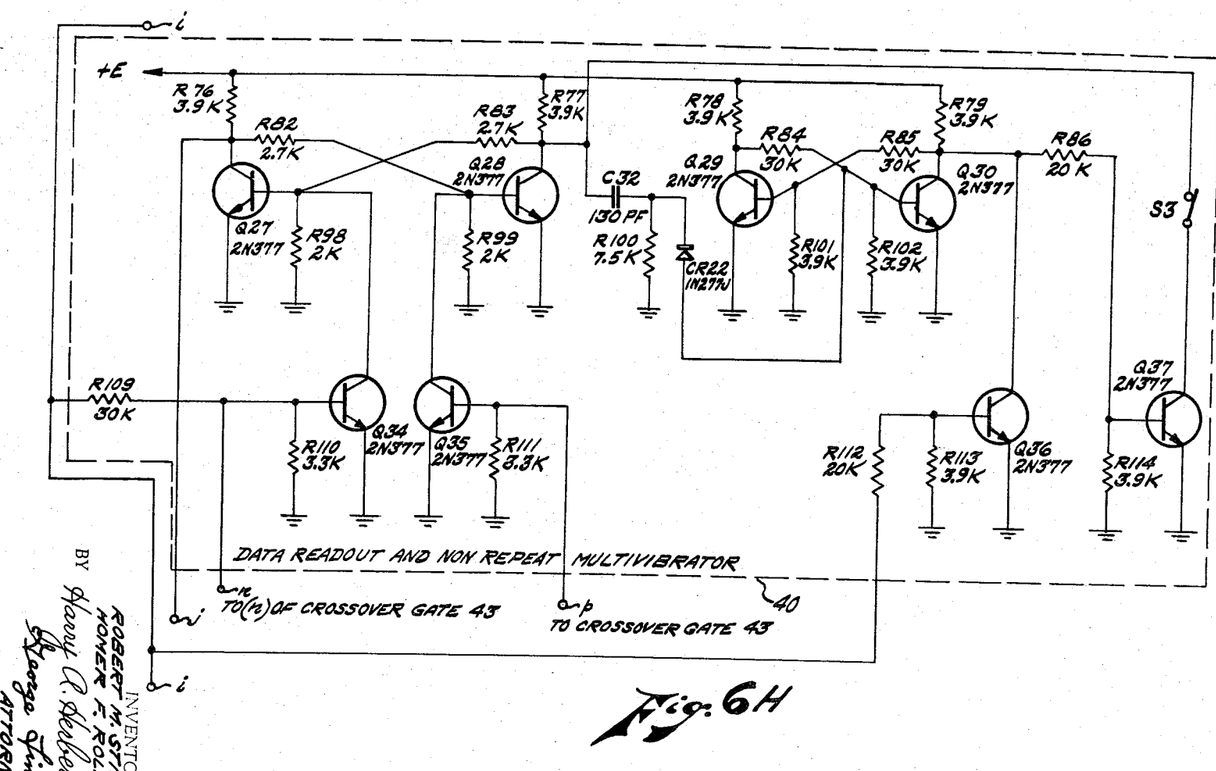

The block diagram of the referenced Doppler cycle/time selector of FIGURE 5 is shown in circuit diagram form in FIGURES 6A through 6K and indicated therein are the values of various elements. These indicated values are by way of example but other preselected values may be utilized and still retain operability. The interconnections between FIGURES 6A–K are as indicated therein to provide one complete, integrated circuit. Now referring to the circuit diagram illustrated in FIGURES 6A–K, there is shown in FIGURE 6A terminal 30 receiving incoming Doppler signal from telemetry receiver 12 of FIGURE 3.

The incoming Doppler signal is routed into amplifier limiter 31 of FIGURE 6A where it is amplified and limited with the Doppler information preserved in the time dimension. The Doppler signal is then routed to magnetic documentation driver 32 and Schmitt trigger and driver 35 of FIGURE 6C. The output at terminal 23 of documentation driver 32 will vary from a pure sine wave to a limited wave dependent on the input level. In Schmitt trigger and driver 35 of FIGURE 6C all Doppler appearing at the threshold level is brought to the same amplitude retaining the frequency information in the time dimension.

Figure 6C:
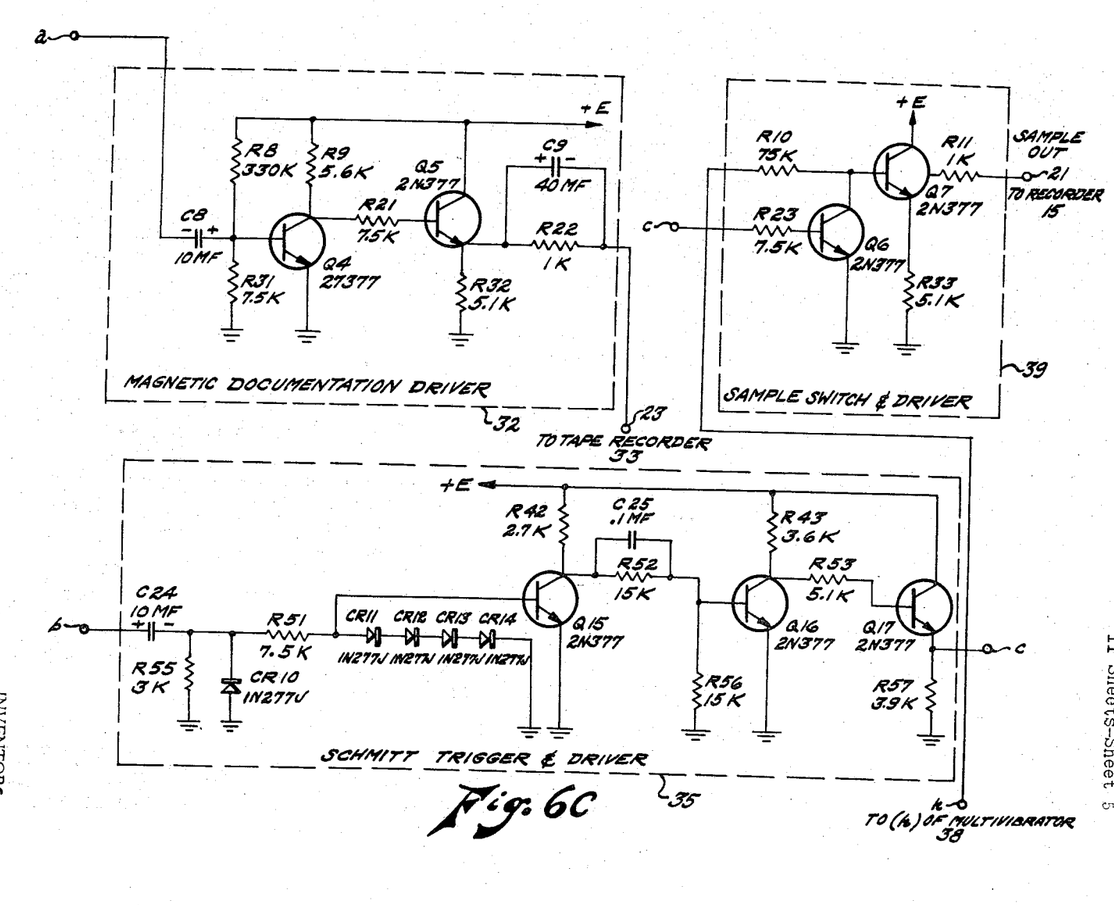
Figure 6D:
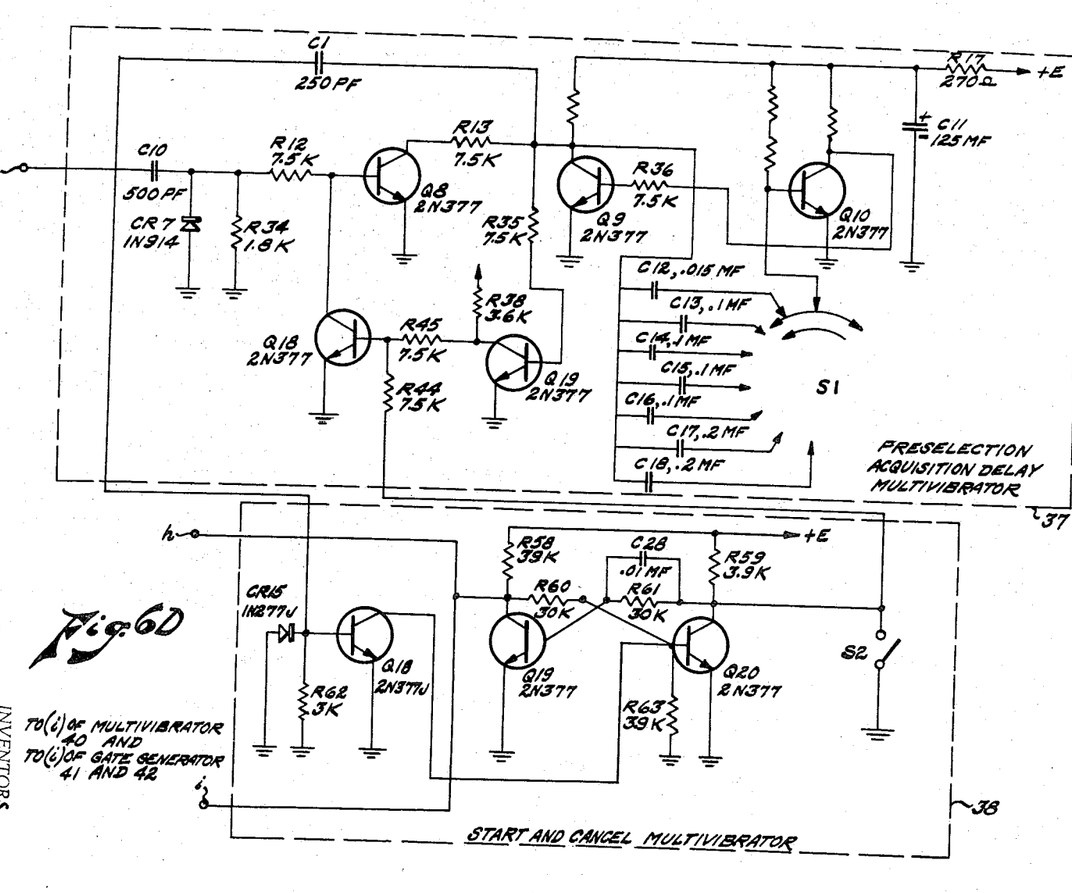
Figure 6E:
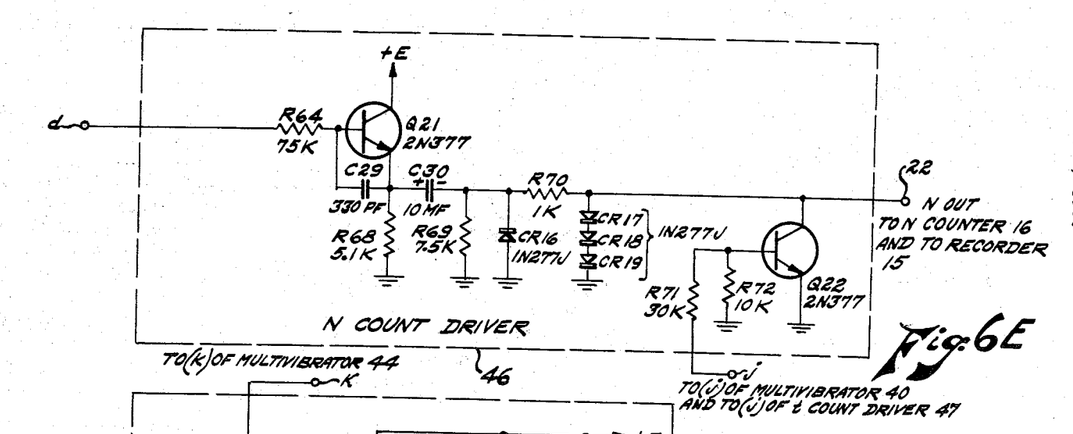

The output of Schmitt trigger and driver 35 of FIGURE 6C is routed to sample switch and driver 39 of FIGURE 6C, preselection acquisition delay multivibrator 37 of FIGURE 6D, and inverter amplifier and driver multivibrator 36 of FIGURE 6B. The acquisition delay is selected by an operator by positioning switch S1 of preselection acquisition delay multivibrator 37 of FIGURE 6D. There can be delays of 1.5 milliseconds to 40 milliseconds. This delay performs two functions relative to the incoming Doppler signal. It triggers on the first output of the Schmitt trigger. During its selected delay it permits the Schmitt trigger to stabilize and lock-in on the increasing amplitude of the incoming Doppler signal and holds off sampling until acquisition is positive. At rundown, it triggers start and cancel multivibrator 38 of FIGURE 6D to its alternate state.

Figure 6F:
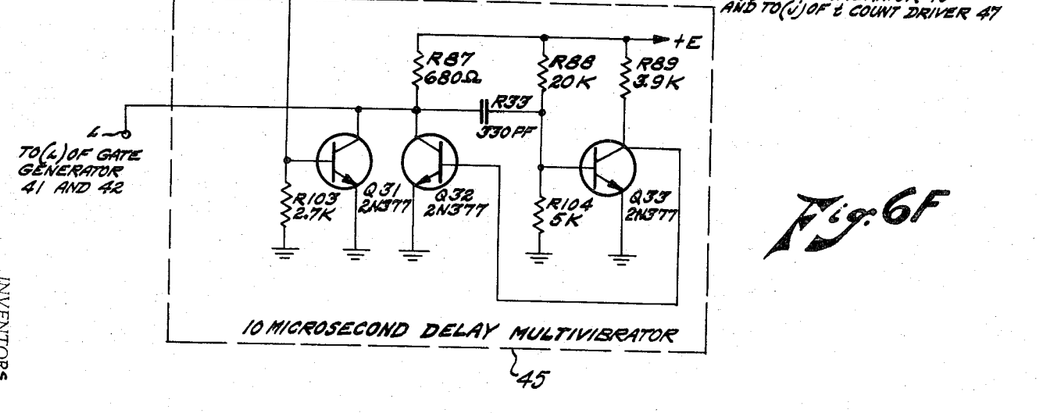
Figure 6G:
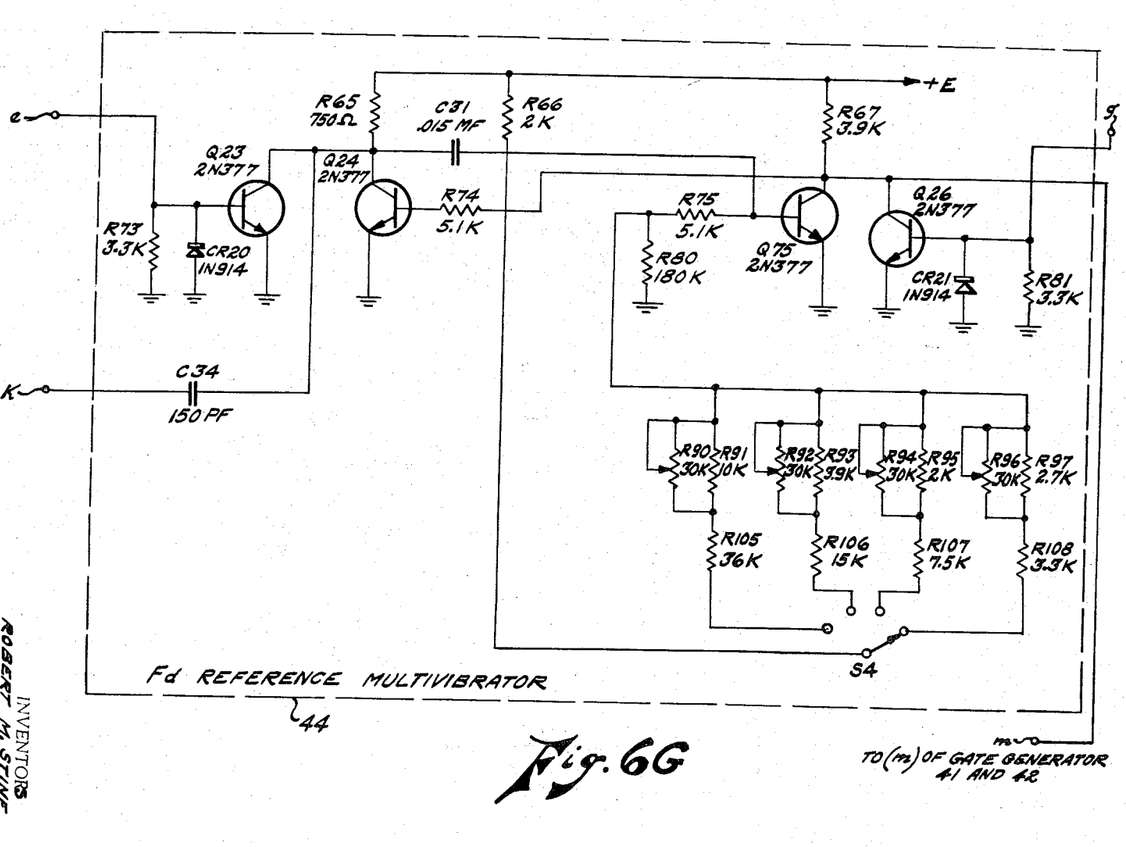
Figures 6J, 6K:
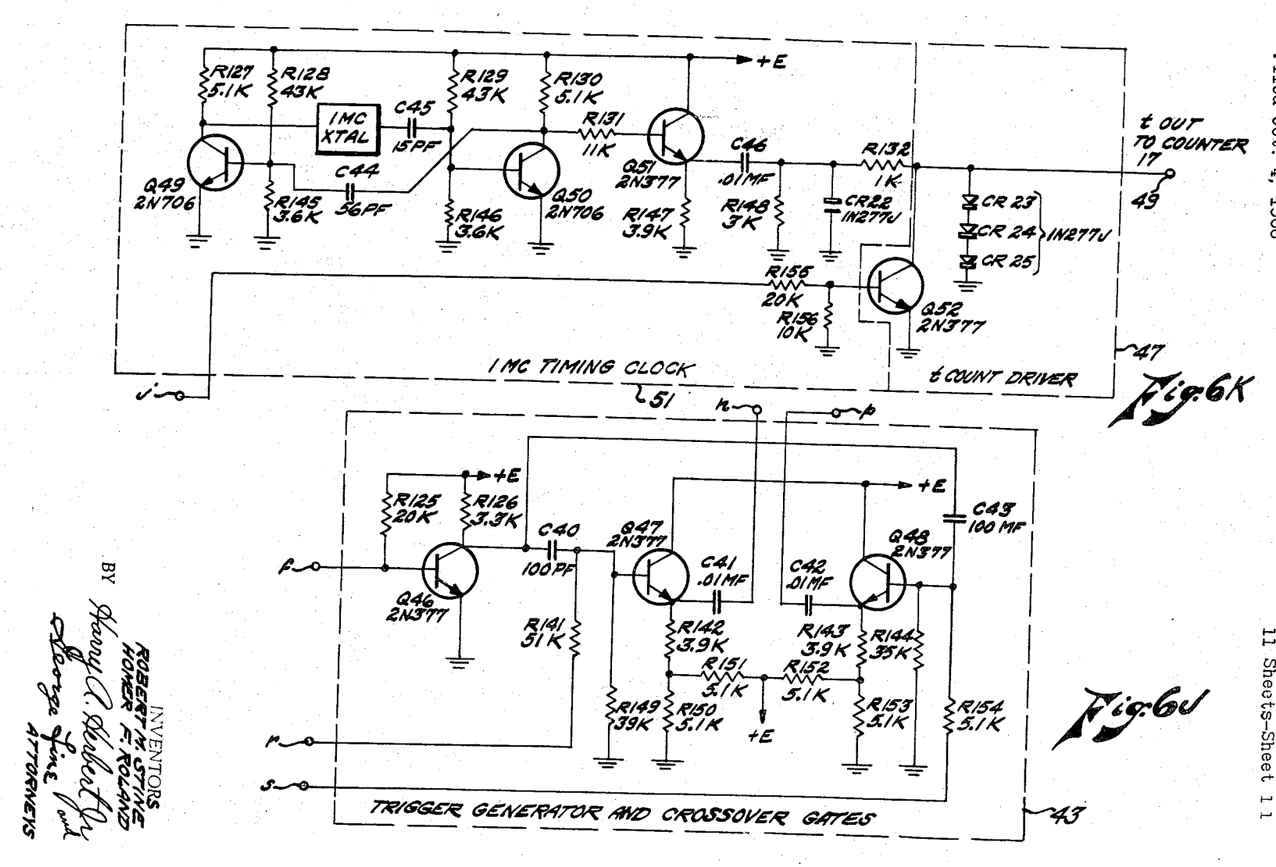

Starting with the first Doppler arriving from Schmitt trigger and driver 35 of FIGURE 6C, inverter amplifier and driver multivibrator 36 of FIGURE 6B, Fd reference multivibrator 44 of FIGURE 6G and 10 microsecond delay multivibrator 45 of FIGURE 6F commence operating. The time period for Fd reference multivibrator 44 represents frequencies of 2 kc., 4 kc., 6 kc. and 8 kc. as selected by positioning switch S4. Outputs from Fd reference multivibrator 44 and 10 microsecond delay multivibrator 45 are routed to low frequency gate generator 41 and high frequency gate generator 42 of FIGURE 6I; however, these gates cannot operate until acquisition delay has ended.

At the end of acquisition delay, start and cancel multivibrator 38 of FIGURE 6D is triggered to the alternate state and removes shorts from sample switch and driver 39 of FIGURE 6C, data readout and nonrepeat multivibrator 40 of FIGURE 6H, low frequency gate generator 41 and high frequency gate generator 42 of FIGURE 6I. Sample Doppler is now readout at terminal 21 and the high and low frequency gate generators permitted to operate.

$F_d$ reference multivibrator 44 of FIGURE 6G is bistable and alternates with each complete incoming cycle from driver multivibrator 36 of FIGURE 6B. Ten microsecond delay multivibrator 45 of FIGURE 6F triggers with each cycle of $F_d$ reference multivibrator 44 of FIGURE 6G.

When $F_d$ reference multivibrator 44 of FIGURE 6G is triggered, its output triggers high frequency gate generator 42 of FIGURE 6I to its alternate state and at the same time resets low frequency gate generator 41 of FIGURE 6I. At shut-off or rundown of $F_d$ reference multivibrator 44 of FIGURE 6G, 10 microsecond delay multivibrator 45 of FIGURE 6F is triggered and after 10 microseconds its output resets high frequency gate generator 42 and triggers low frequency gate generator 41 of FIGURE 6I to the alternate state. The purpose of 10 microsecond delay multivibrator 45 of FIGURE 6F is to delay the shut-off or reset of high frequency gate generator 42 of FIGURE 6I until after arrival of the next trigger to crossover gates 43 of FIGURE 6J. Trigger generator and crossover gates 43 have a positive gate applied at all times from either the high or low frequency gate generators. Thus, one of the crossover gates always gives an output to data readout and nonrepeat multivibrator 40 of FIGURE 6H.

If the incoming Doppler is above the selected $F_d$ of $F_d$ reference multivibrator 44 of FIGURE 6G, the trigger from the crossover gates is applied to the nonconducting side of data readout and nonrepeat multivibrator 40 of FIGURE 6H and nothing happens as it is already cut-off. When the Doppler frequency drops below the $F_d$ selected, the output from the crossover gates is applied to the conducting side of data readout and nonrepeat multivibrator 40 and it is switched to its alternate state. This permits readout from N count driver 46 of FIGURE 5 and $t$ count driver 51 of FIGURE 6K. This readout continues until the Doppler increases above the selected $F_d$ at which time the data readout multivibrator is switched to its other state, thus, halting further readout of N and $t$ data. Once the data readout multivibrator has cycled, it is locked-out from further functioning by its associated nonrepeat multivibrator.

Cancel switch S2 resets start and cancel multivibrator 38 of FIGURE 6D and restores the cycle/time selector to a ready state for the next processing cycle. It is to be noted that block components of the system of this invention are off the shelf items.

Now referring again to the system shown in FIGURE 3, it is noted that the system requires an operator. Doppler effect from the telemetry receiver is routed to the cycle/time selector and the documentation tape recorder. Within the cycle/time selector, Doppler reshaping occurs to improve quality. This reshaped Doppler is printed on the paper recorder.

The operator examines the Doppler print on the paper recorder to determine quality and a suitable delay to overcome Doppler loss at early acquisition. Acquisition loss delay and $F_d$ selections are programmed to the cycle/time selector.

Recorded Doppler from the tape recorder is then played back into the cycle/time selector which after end of acquisition delay, automatically senses the Doppler frequency change through the programmed $F_d$ frequency. Sensing of this transition through the programmed $F_d$ frequency starts the read-out of Doppler cycles, N, and time, $t$, to respective summation counters. The second sensing of the programmed $F_d$ halts further cycle and time read-out to the summation counters.

During the automatic mode of the cycle/time selector, print-out on the paper recorder is made of the reshaped Doppler, sampled Doppler, and the selected N cycles read-out to the summation counter.

The operator must examine paper recorder print-out for proper processing and determine suitability for final calculation of miss distance, using the programmed $F_d$ and the N and $t$ sums stored in the counters. Unsuitability requires a repeat of the processing using a different programmed $F_d$ and/or acquisition delay.

Thus, the present invention provides a method or system for electronically extracting parameters needed to calculate miss distance from Doppler effect is practical. Miss distance calculations can be accomplished within five minutes after reception of Doppler effect from missile detection. Human effort is limited to system operations and decisions regarding suitability of parameters for final calculations of miss distance. Final calculation of miss distance can be accomplished by a computer or a suitable nomograph. The process of extracting scoring paramaters form iss distance calculations automatically includes documentation in the form of permanent magnetic tape recording and print-outs on paper.

What we claim is:

1. A system of extracting miss distance information from a Doppler signal resulting from missile passage through a radiated field surrounding an airborne target comprising an airborne target including a continuous wave radar operating to surround said airborne target with electromagnetic energy of a preselected wavelength, a continuous wave Doppler detector included with said continuous wave radar detecting said Doppler signal resulting from said missile passage through said radiated field surrounding said airborne target, a data link system including an airborne transmitter and ground based telemetry receiver, said transmitter being mounted in said airborne target and operating to transmit said detected Doppler signal to said ground based telemetry receiver, means to tape record the output Doppler signal from said telemetry receiver for documentation and playback purposes, means to simultaneously display said telemetry output signal on a direct writing recorder for examination of quality, means for selecting a reference Doppler frequency from said recorded signals, said selected Doppler frequency being representative of a predetermined point of approach of said missile to said airborne target, means to shape said output Doppler signal from said telemetry receiver to provide a constant amplitude Doppler signal with the frequencies thereof retained in the time dimension, means to sense the above and below frequency condition of said shaped Doppler signals with respect to said reference selected Doppler frequency, said sensing means detecting a first crossover from a high to low frequency about said selected Doppler frequency to provide a first output signal representative of said preselected point of approach of said missile to said airborne target, and also detecting a second crossover from a low to high frequency about said selected Doppler frequency to provide a second output signal representative of a point of departure of said missile from said airborne target with said point of approach and departure being equidistant from said airborne missile, a time counter receiving a predetermined timing signal, a cycle counter receiving said shaped Doppler signal, first and second switches normally closed and operating as a short across said time and cycle counters, respectively, said first output signal from said sensing means operating to remove said shorts to permit said time and cycle counters to operate and said second output signal from said sensing means operating to short said time and cycle counters to provide a precise time and cycle count between said point of approach and said point of departure, and means to compute the miss distance between said missile and said airborne target by utilizing said preselected wavelength, said selected Doppler frequency, the total number of cycles between said points of approach and departure, and the time measurement between said points of approach and departure.

2. A system of extracting miss distance information from a Doppler signal as described in claim 1 wherein said shaping means is comprised of an amplifier limiter receiving the output from said telemetry receiver and a Schmitt trigger circuit receiving the amplifier limiter output, said Schmitt trigger circuit operating to convert all cycles of the Doppler input signal to the same amplitude while retaining frequency thereof in the time dimension.

References Cited

UNITED STATES PATENTS 3,256,519  6/1966  Dewey et al. _________ 343—12

RICHARD A. FARLEY, *Primary Examiner.*

RODNEY D. BENNETT, *Examiner.*

C. L. WHITHAM, *Assistant Examiner.*